Oct. 14, 1958    J. DI NUNZIO ET AL    2,855,831
METHOD AND APPARATUS FOR RELEASING ADJACENT
LAYERS OF MATERIAL FOR OPENING BAGS
Filed Feb. 21, 1955    2 Sheets-Sheet 1
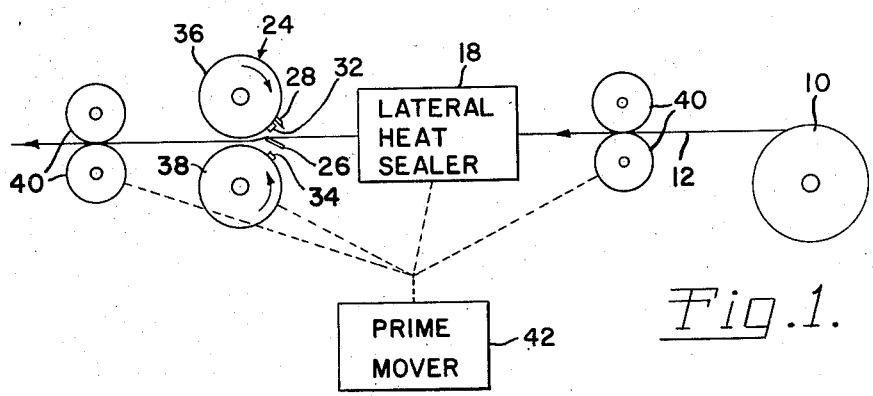
Fig. 1.
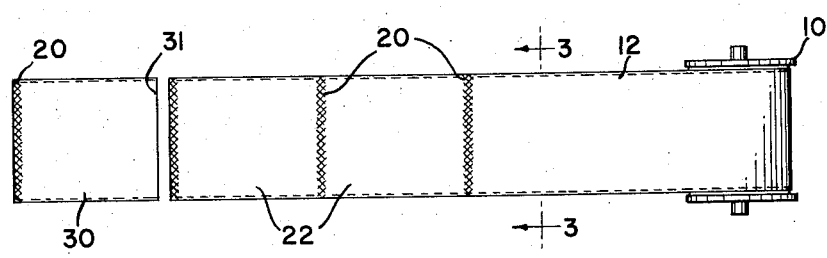
Fig. 2.
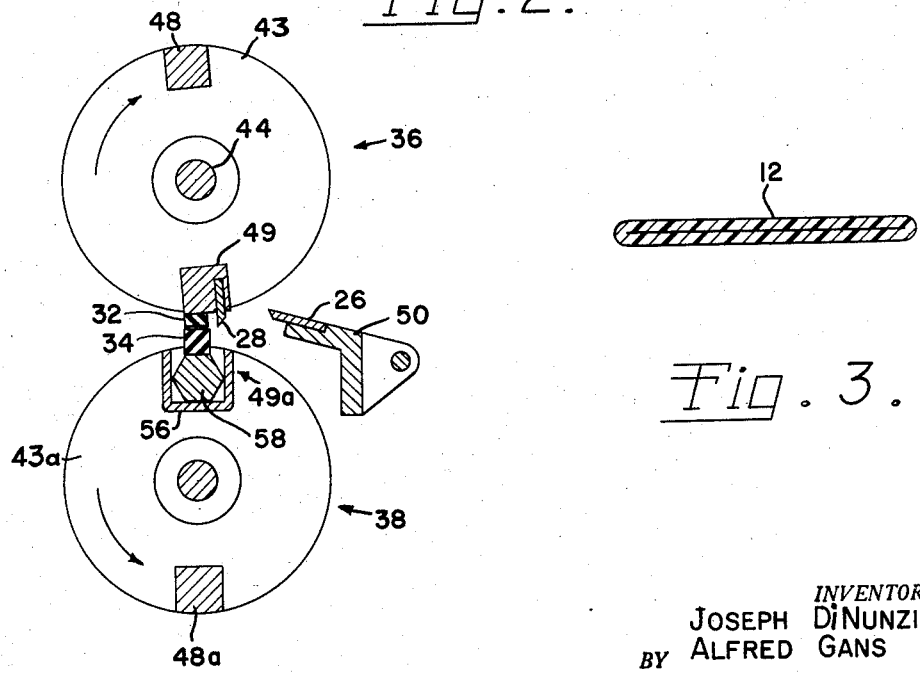
Fig. 3.
Fig. 5.
INVENTOR.
JOSEPH DiNUNZIO
BY ALFRED GANS
Elton T. Barrett
ATTORNEY Oct. 14, 1958   J. DI NUNZIO ET AL   2,855,831
METHOD AND APPARATUS FOR RELEASING ADJACENT
LAYERS OF MATERIAL FOR OPENING BAGS
Filed Feb. 21, 1955   2 Sheets-Sheet 2

INVENTOR.
JOSEPH DiNUNZIO
BY ALFRED GANS

Elton T. Barrett.
ATTORNEY

United States Patent Office 2,855,831
Patented Oct. 14, 1958

2,855,831
METHOD AND APPARATUS FOR RELEASING ADJACENT LAYERS OF MATERIAL FOR OPENING BAGS

Joseph Di Nunzio, Astoria, and Alfred Gans, Elmhurst, N. Y., assignors to Roto Bag Machine Corporation, New York, N. Y.

Application February 21, 1955, Serial No. 489,380

6 Claims. (Cl. 93—8)

This invention relates to improvements in bag-making machines, and particularly to an apparatus for releasing the opening in bags which are fabricated of heat sealable plastic material in a continuous process machine.

In the usual method of making bags from heat sealable plastic material, the layers of a double-layer web of the material become the front and back panels of a series of bags which are formed by passing the web through a machine wherein the layers are sealed together along regularly spaced lateral lines. The web then is cut laterally along one edge of each lateral seal to separate the serially-connected compartments formed by each adjacent pair of seals. As it comes from the machine, each bag is intended to be open at one end where the cut was made and closed at its opposite end by the heat seal.

In some instances, the web may comprise an extruded tube which is folded flat before passing into the lateral sealer. Alternatively, the web may originate as a single layer of material which is folded over to form two superposed layers; the two layers then being sealed together along the open edge to form a closed continuous envelope closely simulating the flattened extruded tube which is used in the first-described arrangement. In either event, the machine delivers individual containers which are closed on three sides and which are intended to be open on the fourth side to receive the material or item to be packaged. The individual containers may be distributed empty for later filling by the purchaser, or may pass directly into a filling machine wherein they will receive their intended contents.

One of the problems encountered with bag making machines of the foregoing general type is that the containers frequently come from the cutter completely closed on all four sides. This is because the plastic material tends to stick together along the line on which the separating cut is made. This may be due to the slight heating of the material caused by the friction of cutting, together with the very high pressure per unit area under which the two layers are forced together during the shearing action of the cutter, or it may be caused by a slight crimping or nesting action on the adjacent plastic sheets caused by the cutting mechanism. In any case, this sticking of the material is most troublesome, as it means that each container must be opened individually at the cut before it can be filled.

It is among the objects of the present invention to provide a method of and apparatus for separating the layers of a multi-layer web of heat sealable material when such layers are stuck together along an edge where a cut has been made. A related object is the provision of an improved bag making machine including such layer-releasing apparatus as an integral part of the machine.

In accordance with a preferred embodiment of the invention, the foregoing and other related objects and advantages are attained by clamping together the layers of material along the line where separation is required, and then shifting the clamped-together layers with respect to each other with a relative sliding motion to cause them to separate.

A more complete understanding of the invention, and of further objects and features thereof, can be had by reference to the following description of an apparatus embodying the invention, when considered in connection with the accompanying drawings, in which:

Figure 1 is a schematic diagram showing the path of movement of heat sealable material through a machine embodying the invention;

Figure 2 is a plan view of the heat sealable material as it passes through various parts of the machine of Figure 1;

Figure 3 is a sectional view on enlarged scale of the material shown in Figure 2, taken along the line 3—3;

Figure 5 is a sectional view of the cutting and bag-opening mechanism, taken along the line 5—5 of Figure 4.

Figure 4:
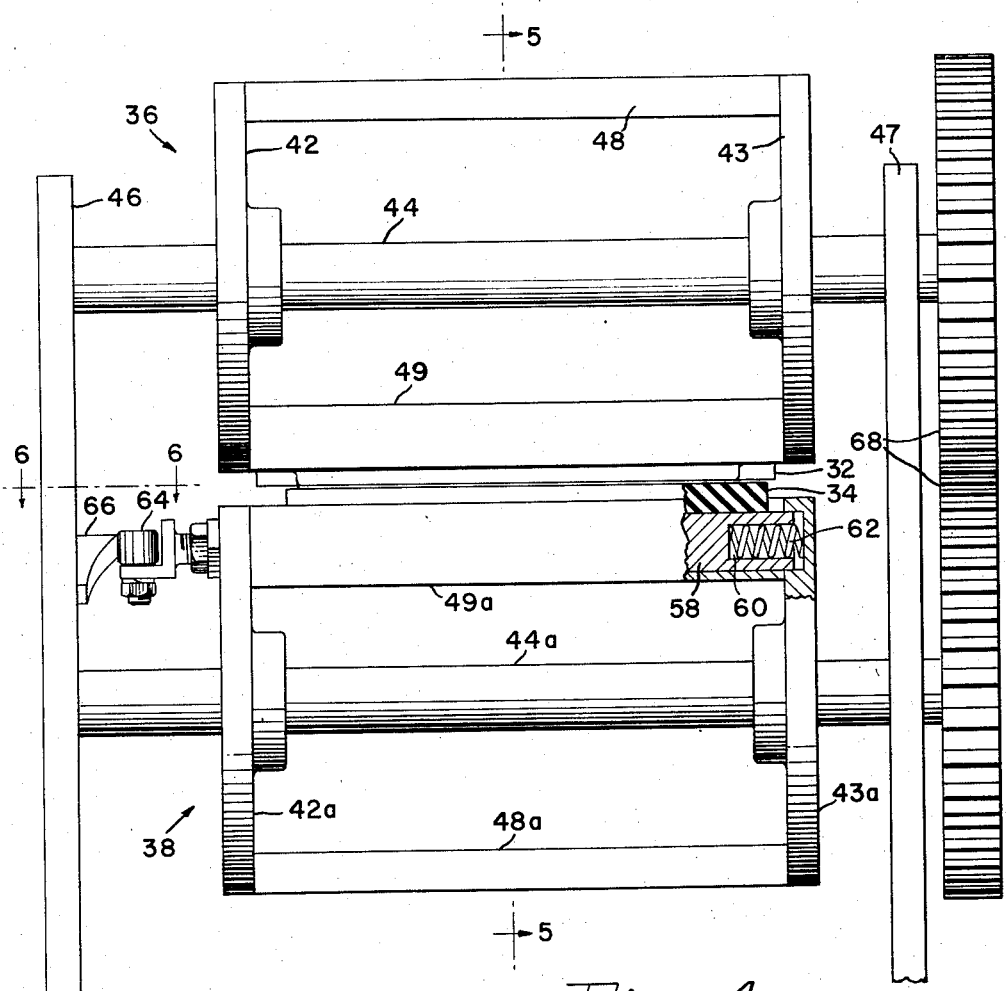
Figure 4 is an elevational view, with certain parts sectioned, of the cutting and bag-opening portion of the machine of Figure 1.

Figure 1 of the drawings shows schematically a bag-making machine of the type in which the present invention may be embodied. The machine includes a supply roll 10 of heat sealable plastic material in the form of a continuous flattened tube 12 as indicated in Figure 3. The web 12 passes through a heat sealing section 18 wherein lateral seals 20 (Figure 2) are made at regularly spaced intervals to divide the continuous envelope into a series of rectangular compartments 22. The compartmented envelope then passes into the cutting and bag-opening section 24 of the apparatus, with which section the present invention is primarily concerned. A bag-making machine of this general type and one to which the present invention can be readily applied is described in U. S. Patent 2,670,783.

The cutter comprises a fixed blade 26 and a rotating blade 28 which cooperate to cut the moving envelope laterally adjacent each lateral heat seal 20 to separate the individual compartments 22 from each other. Each such compartment, accordingly, will become an individual bag 30 (Figure 2) which is closed at one end by the heat seal 20 and which should be open at its opposite end 31 for filling purposes.

In order to be certain that the layers of material will not be stuck together at the "open" end 31, a pair of resilient clamping and scuffing elements 32 and 34 are provided, one mounted on a rotating carrier 36, which carries the blade 28, and the other mounted on a similar cooperating rotating carrier 38. As the elements 32, 34 come together, the end 31 of the bag is gripped firmly between them. By shifting one of the elements 32 or 34 laterally of the path of the bag movement with respect to the other element, the layers of the bag material will be shifted relative to one another breaking loose any adhesion that may have formed when the lateral cut was made.

It will be understood that the machine may include various drive and guide rollers 40 along the path of material travel so that the material can be moved continuously through the machine by a drive motor 42. Also, the operations at the various stations will be synchronized with respect to material movement, as indicated by the broken lines in Figure 1, so that the material will be sealed and cut at properly related points along the web.

Figure 6:
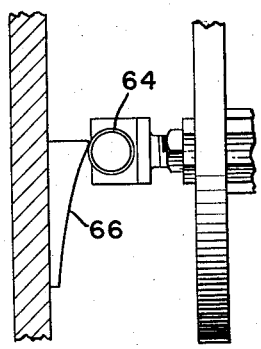
Figure 6 is an enlarged plan view of the camming mechanism in Figure 4, taken on the line 6—6 of Figure 4.

A preferred arrangement of the cutting and bag-opening mechanism is shown in detail in Figures 4, 5, and 6. The rotary support 36 for the blade 28 comprises a pair of end plates 42 and 43 (Figure 4) mounted on a shaft 44 which is journalled in side frame members 46 and 47. The end plates 42 and 43 are joined by spacer members 48 and 49. The blade 28 is mounted in the spacer member 49 to cooperate with the fixed blade 26 which is mounted on a bracket 50 (Figure 6) just ahead of the carrier 36 in the path of material travel. Thus, as the carrier 36 rotates, the blades 28, 26 will come together to cut the moving envelope into individual sections as previously described. At the same time, the layers of envelope material also may become adherent or crimped together along the cut.

To separate the plastic material, the spacer bar 49 on which the blade 28 is mounted carries on its outer surface and just ahead of the blade 28 a pad 32 of rubber or like material which has a surface with a high coefficient of friction. The pad 32 is adapted to cooperate with a similar pad 34 carried by the other rotary carrier 38 mounted below the material path immediately beyond the fixed blade 26. The lower carrier 38, like its counterpart 36, comprises end plates 42A and 43A on a shaft 44A journalled in the side frame members 46 and 47 and joined by spacers 48A and 49A.

The spacer 49A includes a channel member 56 (Figure 5) extending between the end plates 42A and 43A and serves as a guideway for a slidable backing element 58 on which the pad 34 is mounted. The backing element 58 conveniently is formed of a steel rod of hexagonal cross section. At one end, the backing element 58 is recessed as shown at 60 to receive a compression spring 62 (Figure 5) which urges the element 58 away from the adjacent end plate 43A. At its opposite end, the backing element 58 extends through the other end plate 42A and is provided with a cam follower 64 in the form of a roller adapted to strike against a cam 66 fixed to the side frame 46 just beyond the rotor end plate 42A. As the carrier 38 rotates, the cam follower 64 strikes the cam 66 which is shaped to move the backing element 58 and pad 34 endwise against the force of the spring 62. When the follower 64 moves off from the cam 66, the spring 62 will return the parts 34, 58 to their starting position.

The carriers 36 and 38 are arranged to rotate in synchronism, in this instance being coupled by gears 68 keyed to the shafts 44 and 44A. One of the gears 68 will engage a driving gear (not shown) coupled to the main drive of the machine. The cylinders are so oriented that the upper and lower pads 32 and 34 come together as the cylinders rotate, clamping between them the end of the bag section which has just been cut off by the action of the blades 26 and 28. As the pads come together, the endwise movement of the backing element 58 will shift the pad 34 laterally with respect to the upper pad 32. The fractional gripping action of the pads on the layers of material will cause the layers to slide relative to each other in accordance with the relative pad movement since they will be held flat by the clamping action of the pads. The spring 62 returns the lower pad 34 to its original position before the pads release the bag, so that the bag is delivered flat from the machine. It has been found that for most materials only a very small lateral movement is required. For example, in one machine a movement of one to three-sixteenths of an inch was adequate to release completely the bag opening.

It will, of course, be understood that the pad assembly can be completely independent of the cutting mechanism if desired. However, when a rotary cutter is used, the arrangement shown whereby the bags are gripped immediately as they leave the cutter provides a simple yet effective means for insuring that the bags will be gripped at the proper point without additional guiding or indexing mechanisms.

What is claimed is:

1. In a bag-making machine of the type wherein a flat, continuous envelope of heat-sealable material is moved continuously through said machine and including a heat sealer wherein the envelope layers are sealed together by regularly spaced heat seals extending across said envelope and a cutter wherein said envelope is cut into individual containers by lateral cuts made one adjacent each said heat seal so that each said container is closed at one end by a heat seal and intended to be open at the opposite end along the line of said cut, the improvement which comprises adhesion-breaking means for breaking apart the adhesion which may form between the envelope layers at said opposite end of said container, said adhesion-breaking means being disposed immediately after said cutter in the path of travel of said material, said adhesion-breaking means comprising a pair of elongated pads having surfaces with high coefficients of friction, means associated with said pads for bringing said pad surfaces into engagement with each other with a narrow portion of said container at said opposite end thereof clamped between said pads, and means associated with one of said pads for shifting said one pad lengthwise with respect to the other pad to effect similar relative shifting of the clamped portions of the layers of container material.

2. In a bag-making machine of the type wherein a flat, continuous web of heat-sealable material is moved continuously through the machine and wherein the envelope layers are sealed together by regularly spaced lateral heat seals extending across said envelope, said envelope thereafter being cut up into individual containers by lateral cuts made one adjacent each said seal, the improvement which comprises a pair of elongated elements having surfaces with high coefficients of friction and arranged to be clamped together with a portion of an individual container held therebetween, said portion being a narrow strip along the cut on the opposite side of the cut from the heat seal, and means connected to one of said elements for shifting said one element endwise with respect to the other element while said material is held therebetween whereby to shift said layers relative to each other and thereby break the layers apart along the line of said cut.

3. In a bag-making machine of the type wherein a flat, continuous envelope of heat-sealable material is moved through said machine continuously and wherein the layers of said envelope are sealed together along regularly spaced lateral lines, the combination of a pair of rotatable, substantially cylindrical elements between which the material passes, a knife-blade projecting from the surface of one of said elements and extending normal to the path of said material for engagement with a cooperating knife-blade to cut said material laterally adjacent each said heat seal, an elongated pad having a surface of high coefficient of friction mounted on said one element beside said projecting knife-blade and ahead of said blade in the direction of rotation of said element, a second similar pad mounted on the other of said elements and engageable with said first-named pad upon simultaneous rotation of said elements, and means associated with one of said pads for shifting said one pad endwise during engagement thereof with the other of said pads.

4. In a mechanism for breaking an adhesion between two flat layers of material, in combination, a pair of cylindrical-shaped rotatable elements between which to pass said material, an elongated resilient pad carried by each of said elements and extending normal to the direction in which said material moves between said elements, said elements being mounted for rotation in unison and so oriented that said pads will recurrently contact each other upon rotation of said elements, a support member slidably mounted on one of said elements and movable normal to said direction of material movement, the pad which is carried by said one element being mounted on said support member, camming means engageable with said support member upon rotation of said one element for shifting said support member and said one pad endwise while said pads are in contact with each other, and a spring engaging said support member for returning said member and said one pad to their starting position upon disengagement of said camming means.

5. Apparatus for breaking apart layers of heat-sealable material which are cut along an edge, comprising a pair of resilient clamping and scuffing pads positioned along the cut edge and having surfaces with high-coefficients of friction, carrier means associated with said pads for moving said pads together with the stuck-together layers of the material clamped between said pads, first shifting means associated with one of said pads for shifting said one pad with respect to the other pad in a direction following the pad surfaces while said stuck-together layers of material are clamped between said pads for releasing said stuck layers by causing them to slide against one another, and second shifting means associated with said one pad for shifting said one pad in the opposite direction with respect to the other pad while said layers of material are clamped between said pads for returning said layers to their original positions by causing them to slide against one another in the opposite direction, said carrier means thereafter moving said pads apart.

6. Apparatus for cutting a tubular envelope of heat-sealable material having generally parallel sides and for thereafter breaking any residual adhesion between the cut edges of two layers of the tubular envelope, said apparatus comprising knife means for cutting the tubular envelope, opposing parallel pad elements behind said knife means, means for positioning the cut envelope between said pad elements with the cut edges closely parallel to said pad elements, means to clamp said pad elements with a firm pressure against opposite surfaces of the said layers parallel to and closely adjacent to said cut edges, power means for shifting said elements in opposite directions with respect to each other and parallel to each other, said clamping means maintaining said pad elements under firm pressure against said layers along the full length of the pad elements during the shifting of said pad elements to break the adhesion at said cut edges by sliding the layers of said tubular envelope against each other parallel to and closely adjacent to said cut edges, the firm pressure of said pad elements against said layers along the full length of the pad elements preventing wrinkling of said layers during the sliding thereof, and means to move said pad elements apart after the adhesion at said cut edges has been broken.

References Cited in the file of this patent

UNITED STATES PATENTS 2,630,260    Tracy et al. _____ Mar. 3, 1953